(12) United States Patent
Adams et al.

(10) Patent No.: US 12,253,986 B1
(45) Date of Patent: Mar. 18, 2025

(54) DATABASE SCHEMA TO SIMPLIFY PROCESSING AND REDUCE FALSE POSITIVE MATCHES IN AMBIGUOUS DATA

(71) Applicant: Surescripts, LLC, Arlington, VA (US)

(72) Inventors: Norman S. Adams, Scottsdale, AZ (US); Vareck Shawn Bostrom, Portland, OR (US)

(73) Assignee: Surescripts, LLC, Arlington, VA (US)

( * ) Notice: Subject to any disclaimer, the term of this patent is extended or adjusted under 35 U.S.C. 154(b) by 0 days.

(21) Appl. No.: 18/342,455

(22) Filed: Jun. 27, 2023

(51) Int. Cl.
*G06F 16/215* (2019.01)
*G06F 16/27* (2019.01)
*G06F 16/28* (2019.01)

(52) U.S. Cl.
CPC ............ *G06F 16/215* (2019.01); *G06F 16/27* (2019.01); *G06F 16/285* (2019.01)

(58) Field of Classification Search
CPC ....... G06F 16/215; G06F 16/27; G06F 16/285
See application file for complete search history.

(56) References Cited

U.S. PATENT DOCUMENTS

| | | | | |
|---|---|---|---|---|
| 2013/0311448 | A1* | 11/2013 | Thompson | G06F 16/902 707/E17.014 |
| 2017/0024446 | A1* | 1/2017 | O'Kane | G06F 16/2282 |
| 2017/0147698 | A1* | 5/2017 | Chen | G06F 16/215 |
| 2018/0181644 | A1* | 6/2018 | Lyons | G06F 16/951 |
| 2020/0133955 | A1* | 4/2020 | Padmanabhan | G06Q 30/01 |
| 2021/0224614 | A1* | 7/2021 | Jagota | G06N 20/00 |
| 2023/0315787 | A1* | 10/2023 | Collins | G06F 16/9027 707/798 |

OTHER PUBLICATIONS

Papasan, The Timeless Truths of the Database, Mar. 24, 2023, accessed Jun. 5, 2024 at https://www.thetwentypercenter.com/the-timeless-truths-of-the-database/ (Year: 2023).*

* cited by examiner

*Primary Examiner* — William Spieler
(74) *Attorney, Agent, or Firm* — WEAVER IP L.L.C.

(57) ABSTRACT

Methods, systems, apparatuses, and computer program products for building records from false positive matches are disclosed. A master record is identified that incorrectly groups a plurality of source records in a database, where the plurality of source records contain demographic information for multiple people. In the database, a first record, a second record, and exclusion data are created, where the first and second records contain demographic information for each person and the exclusion data indicates that the first record should not be linked to the second record. A matching criteria is applied to each record of a collection of source records that includes the first and second records and the plurality of source records to identify a set of connections. The first record and the second record are built based at least on the set of connections and stored in the database.

20 Claims, 10 Drawing Sheets

Member ID 123456
Mary Ann Smith
3/24/73
1234 Oak St, 85424
5678 Main St, 85223
999 Elm St, 85233
480-222-3456
480-222-5678

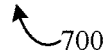

FIG. 7A

| Location | Record | First Name | Middle Name | Last Name | DOB | Address | Zip Code | Phone |
|---|---|---|---|---|---|---|---|---|
| STORE A | 123 | Mary | Ann | Smith | 3/24/1973 | 1234 Oak St | 85424 | 480-222-3456 |
| STORE B | 345 | Mary | | Smith | 3/24/1973 | 5678 Main St | 85223 | 480-222-5678 |
| STORE A | 567 | Mary | | Smith | 3/24/1973 | | | 480-222-5678 |
| STORE B | 789 | Mary | | Smith | 3/24/1973 | | 85424 | 480-222-3456 |
| STORE C | 890 | Mary | | Smith | 3/24/1973 | 999 Elm St | 85233 | 480-222-5678 |

FIG. 7B

| Location | Record | First Name | Middle Name | Last Name | DOB | Address | Zip Code | Phone |
|---|---|---|---|---|---|---|---|---|
| USERDEF | 777 | Mary | | Smith | 3/24/1973 | 1234 Oak ST | 85424 | 480-222-3456 |
| USERDEF | 888 | Mary | | Smith | 3/24/1973 | 5678 Main St | 85223 | 480-222-5678 |

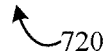

FIG. 7C

| Location | Record | First Name | Middle Name | Last Name | Gender | DOB | Address | Zip Code |
|---|---|---|---|---|---|---|---|---|
| RX | 1 | Alexia | B | Smith | F | 12/20/1980 | 123 Oak St | 85254 |
| RX | 2 | Alexis | Betty | Smith | F | 12/20/1980 | 123 Oak St | 85254 |
| INS | 3 | Alexia | Becky | Smith | F | 12/20/1980 | 456 Main St | 85255 |
| INS | 4 | Alexis | B | Smith | F | 12/20/1980 | 456 Main St | 85255 |

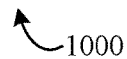

FIG. 10A

| First Name | Middle Name | Last Name | Gender | DOB | Address | Zip Code |
|---|---|---|---|---|---|---|
| Alexia | B | Smith | F | 12/20/1980 | 123 Oak St | 85254 |
| Alexis | B | Smith | F | 12/20/1980 | 456 Main St | 85255 |

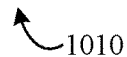

FIG 10B

| User Defined 1 | | | | | | |
|---|---|---|---|---|---|---|
| Alexia | Betty | Smith | F | 12/20/1980 | 123 Oak St | 85254 |
| | | | | | 456 Main St | 85255 |

| User Defined 2 | | | | | | |
|---|---|---|---|---|---|---|
| Alexia | Becky | Smith | F | 12/20/1980 | 123 Oak St | 85254 |
| | | | | | 456 Main St | 85255 |

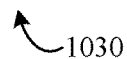

FIG 10C

DATABASE SCHEMA TO SIMPLIFY
PROCESSING AND REDUCE FALSE
POSITIVE MATCHES IN AMBIGUOUS DATA

BACKGROUND

A matching algorithm is commonly utilized to match a plurality of records that have overlapping information. For instance, where a matching algorithm identifies the same name in two separate records, those records can be joined together to create a single master record. While such a matching algorithm can be effective in reducing the amount of duplicate records, the matching algorithm can incorrectly join two records together in some instances. When these types of "false positive" matches combinations are identified, the underlying records are reviewed and split, typically by a manual process, which can be time consuming and inefficient.

BRIEF SUMMARY

Methods, systems, and apparatuses are described for building records from false positive matches, substantially as shown and/or described herein in connection with at least one of the figures, as set forth more completely in the claims. In an example, a master record is identified that incorrectly groups a plurality of source records in a database, where the plurality of source records contain demographic information for multiple people. In the database, a first record, a second record, and exclusion data are created. The first record contains demographic information for a first person, the second record contains demographic information for a second person, and the exclusion data indicates that the first record should not be linked to the second record. The first record and the second record are added to a collection of source records that includes the plurality of source records that are incorrectly grouped together. A matching criteria is applied to each record of the collection of source records to identify a set of connections in the collection of source records, where each connection of the set of connections indicates a match between two records based at least on the matching criteria. An indication of each connection is stored in the database. The first record and the second record are built based at least on the set of connections.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIGS. 7A-7C illustrate the creation of defined records, in accordance with an example embodiment.

FIGS. 10A-10C illustrate the automatic creation of defined records, in accordance with an example embodiment.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
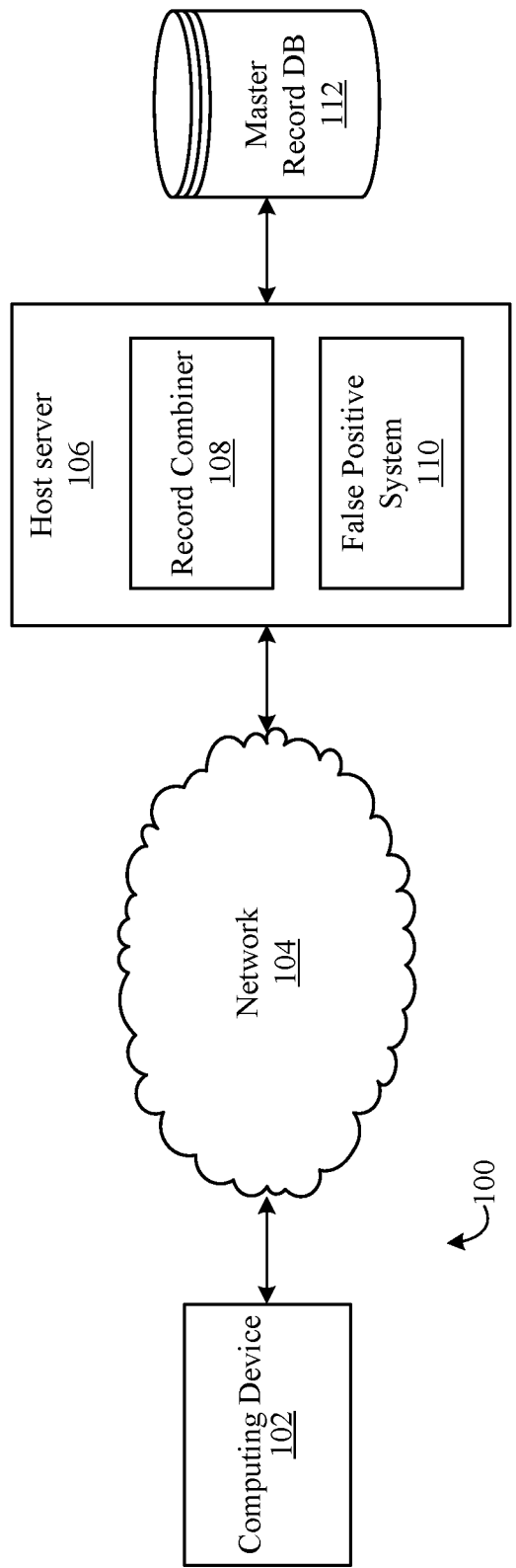
FIG. 1 shows a block diagram of a system for building and maintaining master records, according to an example embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. The use of "or" herein may be interchangeable with the term "and/or" unless otherwise stated.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

If the performance of an operation is described herein as being "based on" one or more factors, it is to be understood that the performance of the operation can be based solely on such factor(s) or can be based on such factor(s) along with one or more additional factors. Thus, as used herein, the term "based on" should be understood to be equivalent to the term "based at least on."

Still further, it should be noted that the drawings/figures are not drawn to scale unless otherwise noted herein.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner. That is, the embodiments described herein are not mutually exclusive of each other and may be practiced and/or implemented alone, or in any combination.

II. Example Embodiments

The present subject matter relates to simplifying processing and reducing false positive matches in ambiguous data stored in a database (DB) system. Embodiments provide for methods, systems, and apparatuses for modified database schema to simplify processing and reduce false positive matches in the ambiguous data. The example techniques and embodiments described herein may be adapted to various types of systems and devices, for example but without limitation, computing systems such as personal computers/computing devices, servers, enterprise computing systems, cloud-based platforms, etc. that process, store, and/or execute queries for information and data that relates to data records, including but without limitation, patient medical records in various different ways, in accordance with embodiments. For instance, computing systems that communicate over a network to store and/or access master records (e.g., master patient records) may be configured according to the described embodiments and techniques.

While the embodiments herein may be described with respect to various computing systems and implementations as conceptual and/or illustrative examples for descriptive consistency, other types of electronic and communication devices and implementations are also contemplated for implementing the disclosed techniques. It is contemplated herein that in various embodiments and with respect to the illustrated figures of this disclosure, one or more components described and/or shown may not be included and that additional components may be included.

A matching algorithm is commonly utilized to match a plurality of records that have overlapping information. For instance, where a matching algorithm identifies the same name in two separate records, those records can be joined together to create a single master record. While such a matching algorithm can be effective in reducing the amount of duplicate records, the matching algorithm can incorrectly join two records together in some instances. For example, where a system builds master patient records from data from multiple sources, a master record can be inadvertently created which contains demographics for more than one person. For instance, the matching algorithm may incorrectly match two different records belonging to separate individuals both named "Mary Smith," where the single combined master record contains addresses and phone numbers belonging to both individuals. In another scenario, a matching algorithm may incorrectly match two different records based on a similarity of information contained therein. For instance, a matching algorithm may incorrectly match records corresponding to twins with a similar first name and same last name, or persons with matching names that have the same birthday and the same or similar zip code.

When these types of "false positive" matches (i.e., a master record that incorrectly groups source records associated with different people) are identified, the underlying records are reviewed and split, typically by a manual process (e.g., by a data steward), which can be time consuming and inefficient. In some scenarios, the source records for these false positive matches need to be manually rematched, after which new master records are rebuilt. When a master record has many source records (e.g., more than 100 source records), which is not uncommon, splitting a single master record may require hours of work. Further, there may be thousands or even more false positive matches, depending on the population covered by the database.

In some solutions, preventing false positives from reoccurring is performed by creating a false positive relation between each pair of source records that should not be matched together across the two sets, as well as match rules between the source records in each set that indicate that records of the same set should be matched together. These false positive relations and match rules are stored (e.g., in the database) to prevent the matching algorithm from incorrectly combining these records together when the algorithm is executed at a later time. The number of relations and match rules can, however, be voluminous. For instance, if after splitting a false positive match, one set contains 75 source records and the other contains 100 source records, the database would contain 100×75 false positive relations and (75×74)/2+ (100×99)/2 match relations, which totals to 15,225 relations for a single false positive record. As the number of false positive relations continues to grow over time (e.g., with more source records), performance of the false positive matching algorithm can be degraded.

Embodiments described herein address these and other issues by providing methods, systems, apparatuses, and computer program products for building records from false positive matches, substantially as shown and/or described herein in connection with at least one of the figures, as set forth more completely in the claims. In an example, a master record is identified that incorrectly groups a plurality of source records in a database, where the plurality of source records contain demographic information for multiple people. In the database, a first record, a second record, and exclusion data are created. The first record contains demographic information for a first person, the second record contains demographic information for a second person, and the exclusion data indicates that the first record should not be linked to the second record. The first record and the second record are added to a collection of source records that includes the plurality of source records that are incorrectly grouped together. A matching criteria is applied to each record of the collection of source records to identify a set of connections in the collection of source records, where each connection of the set of connections indicates a match between two records based at least on the matching criteria. An indication of each connection is stored in the database. The first record and the second record are built based at least on the set of connections.

The techniques described herein have numerous advantages, including but not limited to overall improvement of the functioning of the computing devices in which source records are stored, grouped into master records, and/or accessed. For instance, the disclosed techniques store exclusion data in a database in such a manner that reduces the number of relations stored for each false positive match that is split into multiple record. In the above example in which 100×75 false positive relations would be stored in a database to prevent one set of records containing 75 source records from later being combined with another set of records containing 100 source records, techniques described herein may utilize only a single false positive relation (also referred to herein as exclusion data) between two newly defined records. Each source record may then be connected to one of those two records, resulting in a significant reduction in stored relations compared to conventional techniques. By altering the database schema in this manner to enable a reduction of relations, the database stores less data and therefore preserves storage resources. In addition, when a matching algorithm is subsequently executed, the matching algorithm needs to process far fewer relations during execution, thereby reducing processing cycles and improving performance (e.g., speed) of the matching algorithm. Thus, disclosed techniques relate to improvements in at least storage and processing resources of computing devices in which source records are maintained, and can provide various improvements relating to preventing the reoccurrence of false positive matches.

In addition to simplifying the processing as described by spitting false positive matches and storing relation information in a manner that utilizes less resources, the matching algorithm utilized to join newly obtained source records may be run more frequently which can reduce the number of duplicate source records in the system and allow for improvements in the quality of data that is maintained in the database. In other words, disclosed techniques may also allow for a reduction of false positive matches in the stored data.

Example embodiments are described as follows for systems and methods for building records from false positive matches. For instance, FIG. 1 shows a block diagram of a system 100 for building and maintaining master records, according to an example embodiment. As shown in FIG. 1, system 100 includes a computing device 102, a host server 106, and a master record database (DB) 112. Host server 106 includes a record combiner 108 and a false positive system 110. Master record DB comprises one or more DBs for storing master records. Computing device 102, host server 106, and master record DB 112 may be communicatively coupled or linked to each other via a network 104. An example computing device that may incorporate the functionality of computing device 102, host server 106, and master record DB 112 (or any subcomponents therein, whether or not illustrated in FIG. 1) is described below in reference to FIG. 11. It is noted that system 100 may comprise any number of devices, including those illustrated in FIG. 1 and optionally one or more further devices or components not expressly illustrated. System 100 is further described as follows.

Network 104 may comprise at least one network and/or direct connection (i.e., a communication link), or any combination thereof. That is, network 104 may be any combination of the Internet, the "cloud", direct communication links, business and/or enterprise networks, and/or the like. In examples, network 104 is configured to communicatively couple computing device 102, host server 106, and/or master record DB 112 to each other. In some embodiments, such as cloud-based implementations, record combiner 108 and/or false positive system 110 may be implemented as a service or application via network 104.

Computing device 102 includes one or more devices from which source records are obtained. In examples, computing device 102 comprises a database located therein and/or accessible thereto in which source records are created and/or stored. A source record is a collection of information associated with an identifier. In some examples, a source record comprises a collection of demographic information, such as a first name, middle name, last name, date of birth, address, city, zip code, county, country, phone number, email address, gender, etc. associated with an identifier. The identifier can include a store name, a store location, a store identifier, and/or a record number for each source record. In implementations, computing device 102 creates (automatically and/or in response to a user input) a source record each time an individual's demographic information is obtained in response to receiving goods and/or services (e.g., filling a prescription, purchasing goods, obtaining services such as medical services). In some scenarios, a new source record is created where demographic information associated with an individual cannot be located, which can result in multiple source records created for the same individual.

These examples are only illustrative, and demographic information comprising any suitable collection of information can be created and/or stored in response to other actions (e.g., applying for a loan, collecting information for usage in a credit report, storing information in response to online purchases, etc.). In addition, while only one computing device is shown, computing device 102 can include any number of devices (e.g., servers, databases, etc.). In examples, each different computing device may be associated with a different company, store location, medical provider, etc.

In various embodiments, record combiner 108 is configured to combine a plurality of source records in ambiguous data (e.g., records that are not otherwise linked together, and therefore may contain duplicate information and/or relate to common individuals) into a single master record for storage in master record DB 112. Master record DB 112 comprises a database stored on any set of storage and/or memory devices, located local to host server 102 and/or located remotely (e.g., as a cloud storage) for storing master records. A master record, as described herein, includes demographic information (e.g., attributes) from one or more source records obtained from computing device 102. In some examples, a single master record comprises demographic information obtained from a single source record (e.g., where the source record does not match with other source records). In some other examples, a single master record comprises demographic information obtained from a plurality of source records. Master record DB 112 may store master records in any fashion, including but not limited to using one or more databases, files, documents, etc.

Record combiner 108 may operate in various ways, such as by executing a matching algorithm that identifies source records with at least partially overlapping demographic information. Where such a partial overlap exists between a plurality of source records, record combiner 108 may determine whether to combine the records together. In some implementations, the matching algorithm generates a match score indicative of a likelihood that the plurality of source records relate to a common individual. Where the match score is above a threshold, record combiner 108 may combine the records together (e.g., duplicate records obtained from computing device 102) into a single master record.

In some implementations, record combiner 108 may incorrectly group certain source records together into a single master record. For instance, record combiner may incorrectly determine that two source records partially overlap with respect to at least some of their attributes (e.g., a same first and/or last name) and determine that the source records are associated with a common individual. In this manner, the grouping of the plurality of source records may be performed based on a false positive matching between information in the source records. In such instances, a false positive report can be generated (e.g., based on a user in the field, such as a store location or medical provider) indicating that the master record incorrectly comprises demographic information of more than one individual. As described below, false positive system 110 identifies such a master record (e.g., based on a false positive report) and splits the master record into two or more records based on the source records associated therewith.

In some implementations, false positive system 110 creates multiple new records in master record DB 112. False positive system 110 also stores exclusion data in master record DB 112 that indicates that the new records should not be linked to each other (e.g., an indication that each of the newly generated records are associated with different individuals and should not be combined together). Each of the source records that were incorrectly combined into the initial master record are connected to one of the new master records based at least on a matching criteria, as will be described in greater detail below. In examples, false positive system 110 builds each of the newly generated record by combining the attributes of source records connected thereto. In this manner, master records that comprise incorrectly combined source records are split and combined into newly generated master records.

Figure 2:
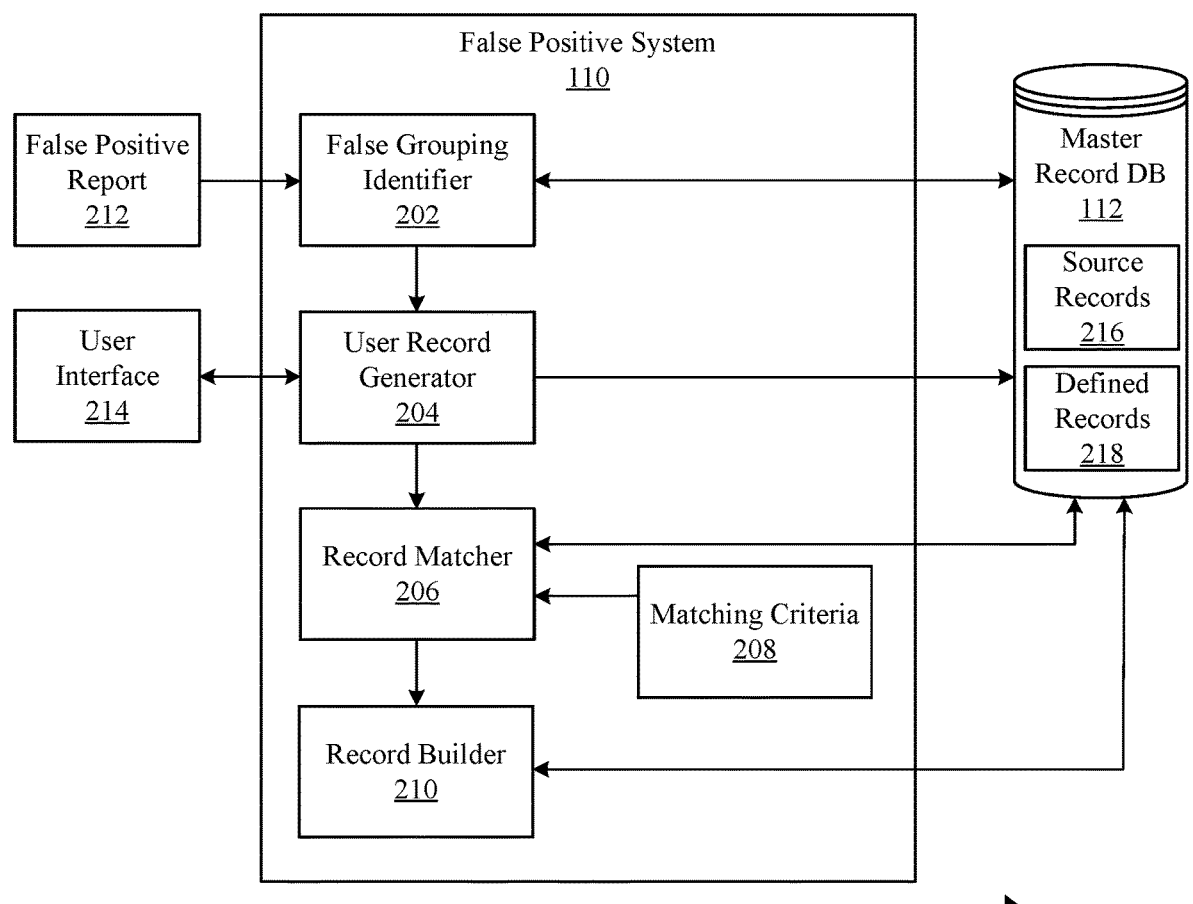
FIG. 2 shows a block diagram of a system for building records from false positive matches, in accordance with another example embodiment.

FIG. 2 depicts a block diagram of a system 200 for building records from false positive matches, in accordance with another embodiment. As shown in FIG. 2, system 200 includes an example implementation of false positive system 110 and master record DB 112. System 200 also includes a false positive report 212 and a user interface 214. As shown in FIG. 2, false positive system 110 includes a false grouping identifier 202, a user record generator 204, a record matcher 206, a matching criteria 208, and a record builder 210. Master record DB 112 includes a plurality of source records 216 and a plurality of defined records 218. In accordance with an embodiment, each of false grouping identifier 202, user record generator 204, record matcher 206, matching criteria 208, and record builder 210 are included in false positive system 110 (e.g., on host server 106). In accordance with another embodiment, one or more of false grouping identifier 202, user record generator 204, record matcher 206, matching criteria 208, and record builder 210 are implemented across a plurality of computing devices or servers. Master record DB 112 may also be implemented within (e.g., local to) false positive system 110 or may be implemented in a remotely located device or devices.

In examples, false positive report 212 is received from a computing device (not shown). False positive report 212 may be generated (e.g., via a user input) in response to a determination that a particular master record stored in master record DB 112 incorrectly contains demographic information from a plurality of separate individuals. For instance, record combiner 108, in some scenarios, incorrectly determines that a plurality of source records should be combined together in a single master record based on overlapping attributes between those source records, even though those source records are associated with different individuals. When the source record is later accessed (e.g., at a pharmacy, a medical provider's office, a point of sale, etc.), a user may determine that the master record contains demographic information that is not intended to be associated with a particular individual. In such instances, the user may cause false positive report 212 to be generated to cause master record DB 112 to be updated (e.g., by removing demographic information not associated with the individual). In examples, false positive report 212 identifies the master record (e.g., using a master record identifier) that incorrectly contains the grouping of source records, one or more individuals (e.g., by name, address, etc.) whose demographic information is known, and/or correct demographic information for such individuals.

False grouping identifier 202 identifies, based at least on information contained in false positive report 212, a master record contained in master record DB 112 that incorrectly groups together a plurality of source records 216. In examples, false grouping identifier 202 identifies each underlying source record that was incorrectly grouped together to form the master record. For example, false grouping identifier 202 may identify a first record from a first store, a second record from a second store, a third record from a third store, and so on that contain at least partially overlapping demographic information but have been incorrectly grouped together by record combiner 108.

User record generator 204 is configured to create defined records 218. In some examples, user record generator 204 generates defined records 218 at least in response to a user input received via user interface 214. For instance, the user input may identify an initial set of attributes for a first defined record (e.g., an initial set of demographic information corresponding to a first person), an initial set of attributes for a second defined record (e.g., an initial set of demographic information corresponding to a second person), and so on for each defined record. In examples, the initial set of attributes comprises one or more attributes that are unique to each defined record. For instance, the initial set of attributes for the first defined record contains at least one attribute that is different from (or not present in) the second defined record. In some other implementations, user record generator 204 generates defined records 218 automatically, or at least partially automatically, based at least on information contained in the underlying source records that were incorrectly grouped together. Illustrative examples of the foregoing implementations will be described in greater detail below.

Upon generation of defined records 218, user record generator 204 stores the defined records in master record DB 112 similar to the manner in which master records are stored therein. In some implementations, defined records 218 (once built, as described later) are indistinguishable from master records stored in master record DB 112 when accessed by other users (e.g., pharmacies, medical providers, etc.). In various examples, user record generator 204 also stores, in master record DB 112, exclusion data that indicates that each of the defined records 218 should not be linked to each other. For instance, the exclusion data prevents record combiner 108 from grouping together defined records during a subsequent execution of a matching algorithm, even if match scores exceed a threshold.

Record matcher 206 is configured to apply matching criteria 208 to the underlying source records associated with the incorrectly generated master record (i.e., the false positive match) to determine which, if any, of the defined records the source records belong. In examples, record matcher 206 connects each of the source records and/or the defined records together based at least on the matching criteria. In some implementations, the connections are generated in the form of a graph, where each source record and each defined record comprises a node in the graph, and each connection indicates at least a partial overlap between the nodes based on matching criteria 208. In examples, matching criteria 208 may indicate that a connection between two nodes exists where the attributes of a first node encompass the attributes of a second node. In some implementations, a complete set of attributes (e.g., identical attributes) from the second node are present in the first node before a connection is present. In another implementation, a reduced similarity (e.g., a partial match of attributes, or a match of attributes that has a similarity above a threshold) is utilized for determining whether two nodes are connected.

In examples, record matcher 206 may be configured to collapse one or more nodes that are connected together. For instance, where a source record is connected to a defined record, the nodes may be connected together into a single node such that the attributes of the defined record include the attributes of the source record. After the collapsing, record matcher 206 may apply matching criteria 208 to reconstruct the graph to identify connections between nodes. In various embodiments in which multiple iterations are performed, record matcher 206 may start with a first iteration that requires a higher similarity (e.g., a set of attributes of one node in a pair of nodes is identical to a set of attributes in the other node of the pair), followed by one or more iterations in which a reduced similarity is utilized. The connection and collapsing process may be performed iteratively until a stopping criteria is reached (e.g., the only two remaining nodes are the defined records, or no more connections are possible based on application of matching criteria 208).

Record builder 210 is configured to build defined records 218 based on the connections between the nodes. For instance, the first record is built by combining the attributes contained within each of the source records connected to the first defined record, the second record is built by combining the attributes contained within each of the source records connected to the second defined record, and so on. In this manner, each of the defined records may be populated with the appropriate set of demographic information contained within their respective set of connected source records. Once built, the defined records are not combined with each other by virtue of the exclusion data discussed herein, thereby preventing the same false positive report from being generated in the future. In examples, record builder 210 stores the defined records in master record DB 112, such that those records may subsequently be accessed by other entities (e.g., pharmacies, medical providers, points of sales, etc.).

Implementations are not limited to the illustrative arrangement shown in FIG. 1 or 2. For instance, the components (or subcomponents) shown therein may be located or remotely from each other, or may be combined together and/or accessible via the same computing device or distributed across a plurality of devices. In some implementations, techniques described herein may be implemented in a single computing device. Furthermore, the foregoing systems may comprise any number of other devices (e.g., databases, storage devices, networks, servers, and/or computing devices) coupled in any manner in accordance with the disclosed techniques.

Figure 3:
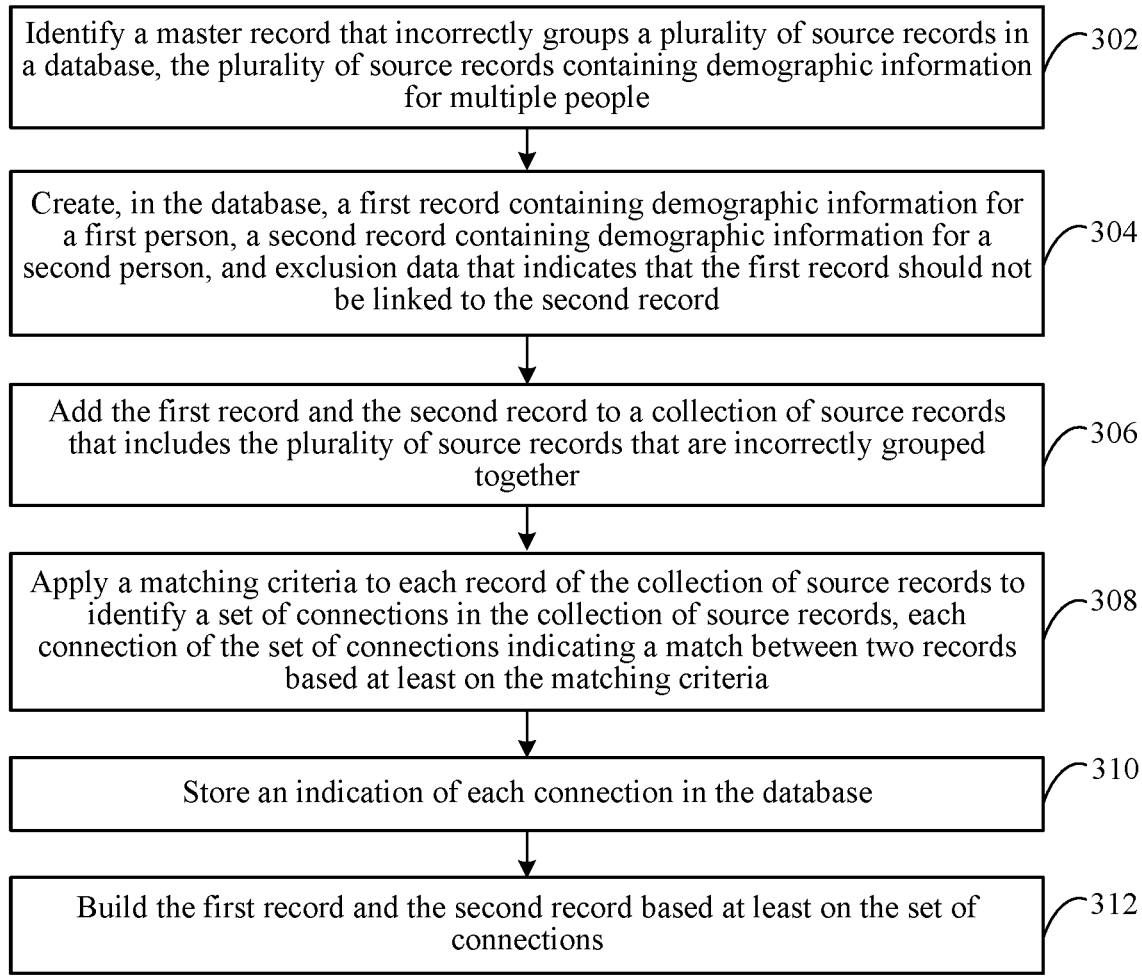
FIG. 3 shows a flowchart of a method for building records based on a false positive match, in accordance with an example embodiment.

Turning now to FIG. 3, a flowchart 300 is shown for building records based on a false positive match, in accordance with an example embodiment. Further structural and operational examples will be apparent to persons skilled in the relevant art(s) based on the following descriptions. Flowchart 300 is described as follows with respect to system 100 of FIG. 1 and system 200 of FIG. 2. In embodiments, one or more steps of flowchart 300 may not be performed.

Flowchart 300 begins with step 302. In step 302, a master record that incorrectly groups a plurality of source records in a database is identified, where the plurality of source records contain demographic information for multiple people. For instance, with reference to FIG. 2, false grouping identifier 202 is configured to receive false positive report 212. Based at least on the information contained in false positive report 212, false grouping identifier identifies a master record in master record DB 112 that incorrectly groups together a plurality of source records 216. In examples, the incorrect grouping is performed by a previous execution of a matching algorithm (e.g., by record combiner 108) that attempts to match source records based at least on overlapping demographic information. However, where the matching algorithm does not perform perfectly, a plurality of source records, which collectively contain demographic information for multiple people, are combined together into a single master record. In such examples, false grouping identifier 202 identifies such a master record and the underlying source records that are incorrectly grouped together.

In step 304, a first record containing demographic information for a first person, a second record containing demographic information for a second person, and exclusion data that indicates that the first record should not be linked to the second record are created in the database. For instance, with reference to FIG. 2, user record generator 204 is configured to create, in master record DB 112, defined records 218 and exclusion data that indicates that each of the defined records should not be linked to one another. Defined records 218 include at least a first record that contains demographic information for a first person and a second record that contains demographic information for a second person.

In some implementations, the demographic information included in the first and second records is received via user interface 214 and/or generated automatically based on an analysis of the source records that were incorrectly grouped together. In examples, the demographic information included in each defined record comprises an initial set of demographic information, such as information that is determined to be unique for a given individual (e.g., the combination of a first name, last name, and zip code). In this manner, each defined record that is created in master record DB 112 is seeded with an initial set of demographic information associated with a particular individual.

The exclusion data included in master record DB 112 indicates that defined records 218 should not be linked together. For instance, when record combiner 108 subsequently executes a matching algorithm to combine records together, exclusion data prevents defined records 218 from being combined with each other, even if a match score between the defined records exceeds a threshold score. In this manner, the exclusion data may override any match score generated by the matching algorithm. In implementations, the exclusion data is stored in such as manner as to indicate that the generated defined records are not to be linked to each other. In such examples, each of the individual source records that are connected to these defined records need not similarly be associated with separate exclusion data, as these source records will be connected to a particular defined record that already has exclusion data associated therewith. In this manner, the number of rules stored accessed by a matching algorithm can be reduced, thereby the matching performance during subsequent executions.

While example techniques are described herein with respect to source records being associated with two individuals, the disclosed techniques may similarly be applied in situations where a master record groups together source records for more than two people, such as by generating three or more defined records. Thus, the disclosed examples are only intended to be illustrative rather than limiting.

In step 306, the first record and the second record are added to a collection of source records that includes the plurality of source records that are incorrectly grouped together. For instance, with reference to FIG. 2, record matcher 206 adds the first record and second record to a collection of source records that includes the plurality of source records that were incorrectly grouped together. In other words, a collection of source records is generated that includes the source records that were grouped incorrectly (e.g., the underlying source records associated with the master record that was the subject of false positive report) and the first and second defined records. As will be described in detail below, this this collection of source records may be selectively connected together to determine how to build each of the first and second defined records.

In step 308, a matching criteria is applied to each record of the collection of source records to identify a set of connections in the collection of source records, where each connection of the set of connections indicates a match between two records based at least on the matching criteria. For instance, with reference to FIG. 2, record matcher 206 is configured to apply matching criteria 208 to each record in the collection of source records to identify a set of connections. In examples, each connection of the set of connections indicates a "match" between two records, where the match is determined based on parameters set forth in matching criteria 208. In various embodiments, the connections may be performed using a graph, where nodes of the graph represent a record (e.g., one of the source records or a defined record), and connections represent a match between the nodes. In this manner, each defined record may be connected to any number of the underlying source records that were incorrectly grouped together based on the matching criteria (e.g., how much overlap is present between attributes of such records).

In examples, where a given source record (e.g., one of source records 216) matches a plurality of defined records (e.g., based on application of matching criteria 208), record matcher 208 may be configured to identify a particular one of the defined records that has the highest match score with the source record, and connect the that defined record with the score record. In this manner, a level of similarity or overlap between a source record and each of the defined records can serve as a tiebreaker, in the event that the source record has a sufficient level of similarity (e.g., more than a threshold amount) between multiple defined records. However, as noted earlier, the exclusion data included in master record DB 112 prevents defined records from being connected together, thereby preventing defined records from being merged.

In some implementations, record matcher 206 may apply the matching criteria over a plurality of iterations. Each iteration may comprise collapsing nodes of a graph that are connected to each other and/or reconstructing the graph with the remaining nodes after the collapsing. Such an iterative process may be performed until a stopping criteria is reached (e.g., no more connections can be made, the only two nodes remaining are the defined records, etc.). Additional details and examples of the iterative process will be described below.

In step 308, an indication of each connection is stored in the database. For instance, with reference to FIG. 2, record matcher 206 is configured to store an indication of each connection of the set of connections in master record DB 112. In examples, the connection stored in master record DB 112 indicates that a particular source record is connected or linked to one of the defined records. For instance, if multiple source records are connected to a particular defined record based on the connecting and collapsing processed as described herein, record matcher 206 stores an indication in master record DB 112 that each of those multiple source records are connected to the particular defined record. In some examples, record matcher 206 need not store an indication that one underlying source record is connected to another underlying source record but instead stores connections between underlying source records and the defined records. In this manner, the number of connections stored in master record DB 112 may be reduced, which can improve the overall performance of the system when a matching algorithm is later executed.

In step 310, first record and the second record are built based at least on the set of connections. For instance, with reference to FIG. 2, record builder 210 is configured to build each of the defined records based at least on the set of connections. In an example, a first defined record is built by combining (e.g., merging) the attributes from each of the source records that are connected to the defined record, and the second defined record is built by combining the attributes from each of the source records that are connected to the second defined record. In this manner, the initial master record that incorrectly grouped the plurality of underlying source records may be efficiently split into separate defined records, each of which are linked to a respective subset of the underlying source records.

Figure 4:
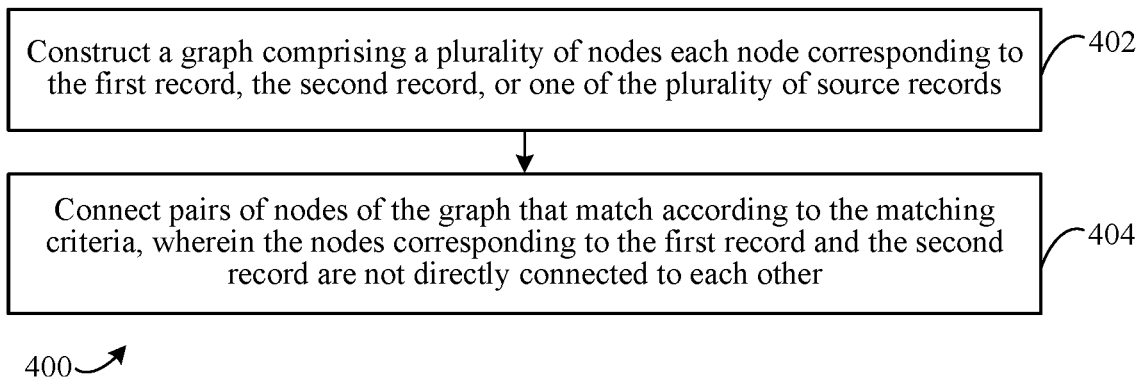
FIG. 4 shows a flowchart of a method for constructing a graph of records, in accordance with an example embodiment.

Turning now to FIG. 4, a flowchart 400 is shown for constructing a graph of records, according to an example embodiment. Further structural and operational examples will be apparent to persons skilled in the relevant art(s) based on the following descriptions. Flowchart 400 is described as follows with respect to system 100 of FIG. 1 and system 200 of FIG. 2. In embodiments, one or more steps of flowchart 400 may not be performed.

Flowchart 400 begins with step 402. In step 402, a graph comprising a plurality of nodes is constructed, where each node corresponds to the first record, the second record, or one of the plurality of source records. For instance, with reference to FIG. 2, record matcher 206 is configured to construct a graph comprising a plurality of nodes, where each nodes corresponds to one of defined records 218 or one of the plurality of source records that were incorrectly grouped together. In examples, such a graph is constructed as an initial graph (e.g., as a first iteration of plurality of iterations), where each of the records in the collection of source records corresponds to a node of the graph.

In step 404, pairs of nodes of the graph that match according to the matching criteria are connected, where the nodes corresponding to the first record and the second record are not directly connected to each other. For instance, with reference to FIG. 2, record matcher 206 is configured to connect pairs of nodes of the graph according to matching criteria 208. In implementations, the defined records that are created by user record generator 204 are not directly connected to each other. Rather, the defined records may be directly (or indirectly) connected to one or more of the underlying source records that were incorrectly grouped together, based at least on the parameters of matching criteria 208.

As described herein, a plurality of iterations may be performed in which the graph is generated and collapsed, based on the connections that are present between nodes. For instance, in a first iteration, record matcher 206 may be configured to connect nodes together where one node comprises attributes that are completely (e.g., identically) included in another node. In another implementation, record matcher 206 may require a less than identical similarity between attributes in determining whether to connect two nodes. In various embodiments, record matcher 206 may perform multiple iterations where the first iteration requires a higher level of similarity between node attributes to connect nodes, where one or more subsequent iterations requires a lesser level of similarity between node attributes to connect nodes.

Figure 5:
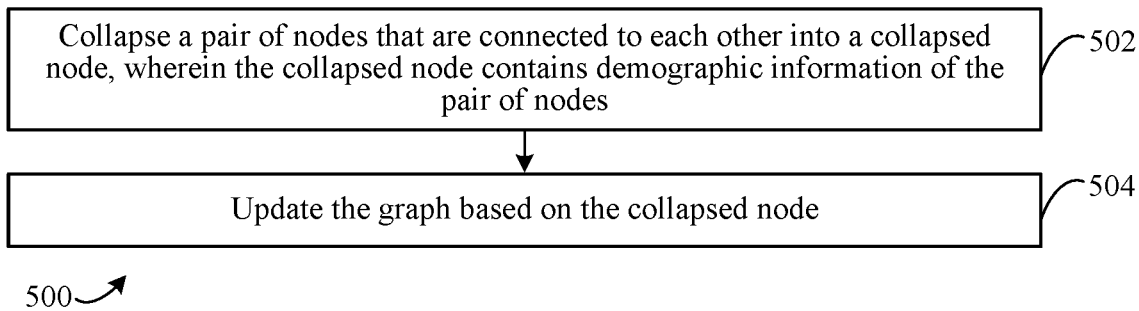
FIG. 5 shows a flowchart of a method for updating a graph of records after collapsing nodes, in accordance with an example embodiment.

Turning now to FIG. 5, a flowchart 500 is shown for updating a graph of records after collapsing nodes, according to an example embodiment. Further structural and operational examples will be apparent to persons skilled in the relevant art(s) based on the following descriptions. Flowchart 500 is described as follows with respect to system 100 of FIG. 1 and system 200 of FIG. 2. In embodiments, one or more steps of flowchart 500 may not be performed.

Flowchart 500 begins with step 502. In step 502, a pair of nodes that are connected to each other is collapsed into a collapsed node, where the collapsed node contains demographic information of the pair of nodes. For instance, with reference to FIG. 2, record matcher 206 is configured to identify two nodes that are directly connected to each other (e.g., without an intermediate node in between) based at least on matching criteria 208. For these two nodes that are connected to each other, record matcher 206 collapses the nodes into a single node (e.g., a collapsed node), where the collapsed node contains (e.g., merges) the demographic information of the two nodes. As an example, a defined record may be directly connected to one of the underlying source records based on an application of matching criteria 208 (e.g., by determining that the attributes of the source record are encompassed by the defined record). In such an example the node corresponding to the source record may be collapsed into the node corresponding to the defined record, where the node corresponding to the defined record includes attributes of both nodes.

In step 504, the graph is updated based on the collapsed node. For instance, with reference to FIG. 2, record matcher 206 is configured to update (e.g., reconstruct) the graph, as a subsequent iteration, wherein the updated graph comprises the collapsed node. In examples, the collapsed node may be connected to one or more other nodes based on application of matching criteria 208, and further collapsing may be performed in a similar manner. Any number of additional pairs of nodes that are connected to each other in each subsequent iteration consistent with the disclosed techniques, and the graph can be updated after each such iteration. Iterations such as these may be performed until a stopping criteria is reached (e.g., the graph does not contain any more nodes that are connected to any of the defined records), at which point the defined records may be built for storage in master record DB 112. Non-limiting illustrations depicting this iterative process are described below with reference to FIGS. 8A-8B and 9A-9D.

Figure 6:
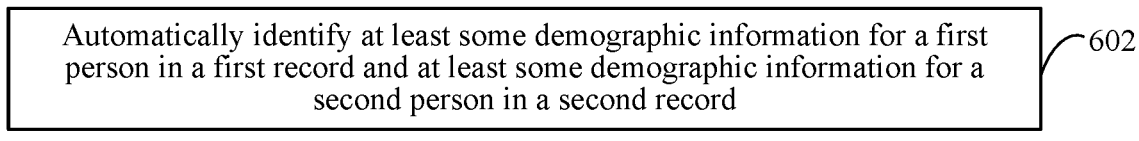
FIG. 6 shows a flowchart of a method for automatically generating the defined records, in accordance with an example embodiment.

Turning now to FIG. 6, a flowchart 600 is shown for automatically generating the defined records, according to an example embodiment. Further structural and operational examples will be apparent to persons skilled in the relevant art(s) based on the following descriptions. Flowchart 600 is described as follows with respect to system 100 of FIG. 1 and system 200 of FIG. 2.

Flowchart 600 begins with step 602. In step 602, at least some of the demographic information for the first person in the first record and at least some of the demographic information for the second person in the second record are identified automatically. For instance, with reference to FIG. 3, user record generator 204 is configured to automatically identify at least some of the demographic information for the first person in the first defined record and at least some of the demographic information for the second person in the second defined record. In examples, the automatic identification of such demographic attributes may be performed in response to an identification of an attribute that differentiates the first person and the second person.

For instance, user record generator 204 may analyze the underlying source records that were incorrectly grouped together (i.e., the source records that are the subject of false positive report 212), and identify an attribute across these source records that differentiates the multiple individuals to which the source records relate. In one illustration, user record genitor 204 may automatically determine that a zip code field is a differentiating attribute between the multiple people. In such a scenario, user record generator 204 may automatically generate the defined records with an initial set of attributes that includes the zip code field (among other attributes). Based on such an initial set of attributes for the defined records, record matcher 206 may connect and/or collapse nodes together in a similar manner as described above, to build the defined records. Non-limiting illustrations depicting the automatic identification of demographic information for the defined records are described below with reference to FIGS. 10A-10C.

FIGS. 7A-7C illustrate the creation of defined records, in accordance with an example embodiment. FIG. 7A, for instance, depicts an example master record 700 that contains demographic information of multiple people. In this example, the creation of master record 700 was the result of an incorrect combination of multiple underlying source records (e.g., by record combiner 108) based on a matching algorithm. As a result of the combination, the master record shown in FIG. 7A groups together multiple addresses and phone numbers of different individuals, each having at least the same first name, last name, and date of birth.

FIG. 7B depicts a listing 710 of underlying source records that were incorrectly grouped together to create master record 700. As shown in FIG. 7B, each source record may comprise various attributes, including but not limited to a store name or location, a record number, a first name, a middle name, a last name, a date of birth (DOB), an address, a zip code, and/or a phone number. These attributes are only illustrative, and other attributes in addition to or as an alternative to those shown may be present for each source record. As depicted in FIG. 7B, each of the source records comprise same first name, last name, and date of birth. Based at least on this overlap, record combiner 108 may have determined to combine the source records together to create master record 700. However, in such an instance where the source records indeed relate to different individuals (and therefore were incorrectly grouped together), false positive report 212 may be received by false positive system 110 indicating that master record 700 contains an incorrect grouping of source record (e.g., a false positive grouping).

As described herein, defined records are generated which can contain an initial set of demographic information for each distinct individual in the listing 710 of source records. In this example, FIG. 7C depicts a listing 720 of defined records that can be generated in accordance with the disclosed techniques. As shown in FIG. 7C, a first defined record (identified as record "777" in FIG. 7C) is created with the following attributes: first name (Mary), last name (Smith), DOB (Mar. 24, 1973), address (1234 Oak St.), zip code (85424), and phone (480-222-3456). A second defined record (identified as record "888") is created in a similar manner, as shown in FIG. 7C. In various embodiments, the defined records illustrated in FIG. 7C may be created based on an input received from user interface 214. In another example, the defined records may be created based on information contained within false positive report 212 (e.g., which may identify the different individuals and/or associated attributes for the false positive match). In another example, the defined records may be created automatically, in whole or in part.

In example implementations, the defined records are created with exclusion data as described herein. Such exclusion data, which can also be referred to as a false positive relation, prevents the defined records from being linked together in the future. The false positive relation can be stored in any suitable manner, such as in a relations table of master record DB 112.

Figure 8A:
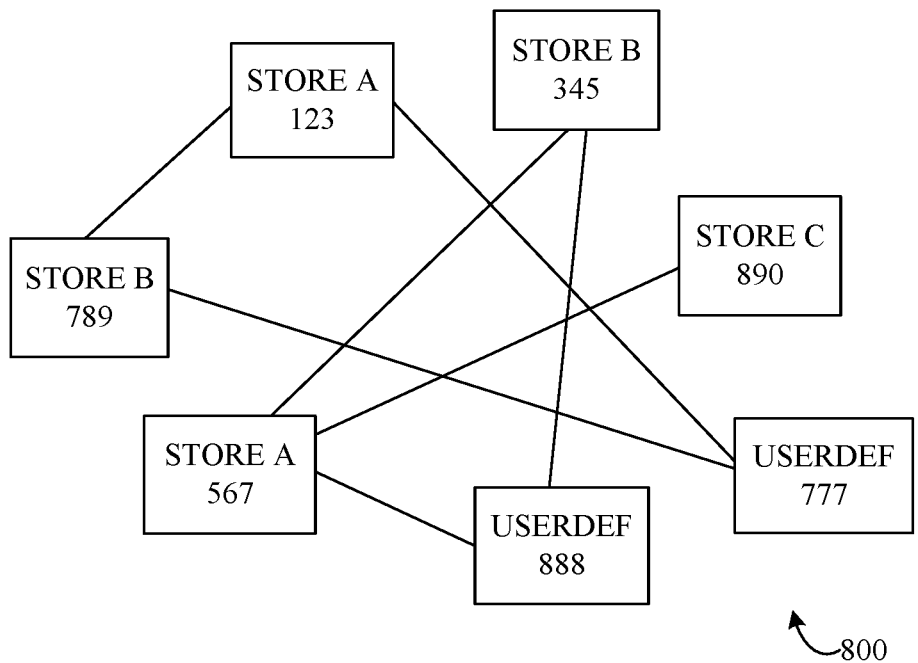
FIGS. 8A-8B illustrate a graph of nodes corresponding to source records and defined records, in accordance with an example embodiment.

After the defined records are created, a graph may be generated in which nodes of the graph represent the underlying source records and the defined records. FIG. 8A illustrates a graph 800 of nodes corresponding to source records, in accordance with an example embodiment. In FIG. 8A, each of the source records shown in FIG. 7B and each of the defined records shown in FIG. 7C are represented as nodes. In accordance with the disclosed techniques, each of the nodes may be connected together (depicted by lines connecting the nodes) based on a matching criteria. In examples, the nodes corresponding to the defined records are not directly connected to each other in the graph, as those nodes have a false positive relation.

In some implementations, a connection is determined to exist in various ways. For instance, a connection may exist between nodes where a match score (e.g., a level of similarity between a set of attributes of a first node and a set of attributes of a second node in a pair) is above a threshold value (e.g., a splitting parameter, which may be set to a maximum value in some implementations), and/or where the attributes of one node are a subset of the attributes of another node. The threshold value may be configurable in various implementations. In some embodiments, the threshold value is lowered for subsequent iterations such that a lesser similarity between nodes may result in a connection being present (e.g., a majority of attributes overlap, attributes not matching exactly, etc.). For instance, if an additional record (not shown in FIG. 8A) was present in which a slight difference existed in a street address (e.g., due to a different spelling of a street name or an incorrect house number), lowering the threshold value may allow the additional record to be merged with one of the defined records in a subsequent iteration even though it was not merged in a prior iteration. Thus, by reducing the similarity required for subsequent iterations, connections that were not made during a previous iteration may be identified in a subsequent iteration.

In some implementations, the determination of whether a connection is present between nodes may be based at least on a ratio of scores, such as a ratio of a match score (e.g., as determined by a matching algorithm) between the two nodes divided by a minimum self score. This ratio may be referred to herein as a relative score. In examples, the self score for a node represents a match score when the node is compared to itself. In other words, this self score is indicative of the score if all of the node's attributes match itself. In some examples, the self score may be calculated based on a probabilistic scoring technique. In this manner, the minimum self score represents the best score that can be achieved for a given node. For example, when comparing a first node to a second node, the highest score that could be obtained occurs where the first node has exact matches (e.g., name, DOB, phone, etc.) for attributes contained in the second node, even if the second node contains additional attributes. Where one node contains attributes that are a subset of another node, the relative score will have a value of 1, which represents the highest possible relative score that can be calculated. Where some attributes between one node are different than the attributes of a second node (e.g., a different phone number), the relative score will have a value less than 1. In examples, the determination of whether a connection is present may be based on whether the relative score exceeds a threshold value, which may be different for each iteration as described herein (e.g., a higher threshold may be required for the first iteration, versus a lower threshold for one or more subsequent iterations).

In the illustration of FIG. 8A, for instance, STORE B 345 and STORE A 567 are connected to each other because STORE A 567 has the exact same name, DOB and phone as STORE B 345. Even though STORE B 345 has additional attributes (e.g., a zip code), a connection is still present in this example since the attributes of STORE A 567 match those contained in STORE B 345 (i.e., one is a subset of the other). Other connections shown in FIG. 8B can be made based on a similar application of a matching criteria to generate a graph in which various nodes are connected to each other.

Figure 8B:
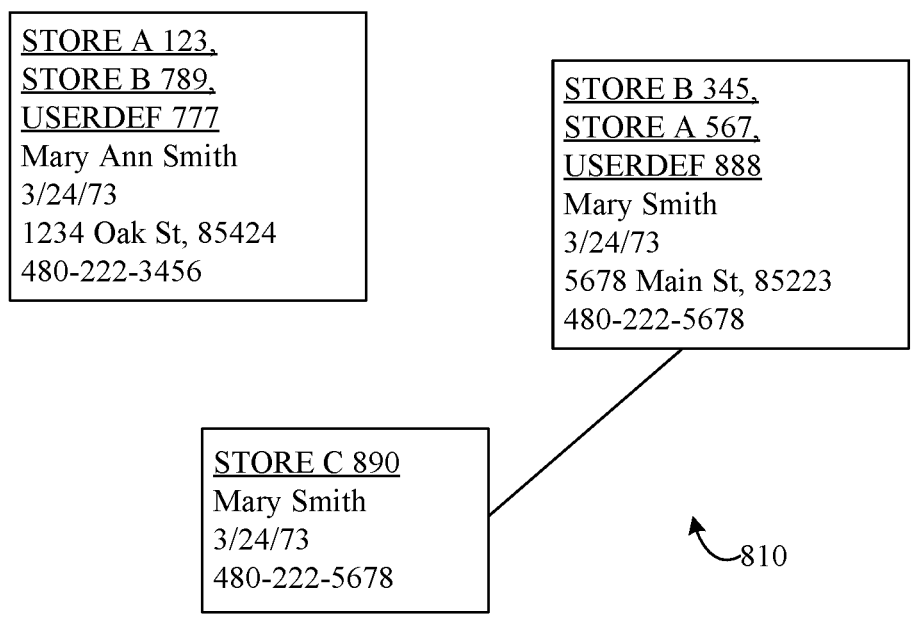

FIG. 8B shows a graph 810 of nodes after collapsing. As shown in graph 810 of FIG. 8B, nodes that are connected to each other (e.g., completely connected subgraphs where each of the nodes in the subgraphs are directly connected to one another) may be collapsed (e.g., merged) into a single node. For instance, STORE A 123, STORE B 789, and USERDEF 777 are collapsed into a single node, while STORE B 345, STORE A 567, and USERDEF 888 are collapsed into another node. As shown in FIG. 8B, STORE C 890 is connected to the node corresponding to USERDEF 888. Although not shown herein, these two records may be combined and merged in a subsequent iteration as these two nodes form a completely connected graph, in a similar manner as described herein (e.g., by determining that the attributes of one node are a subset of the other). In this manner, the master record shown in FIG. 7A may be split into two separate defined records, each corresponding to a different individual.

In some embodiments, an additional overlapping source record (e.g., a new source record that was not previously obtained) may be obtained after each of the defined records are built and stored in master record DB 112. In such an example, record matcher 206 may be configured to identify the additional source record that overlaps with the defined records (e.g., based on application of a matching criteria) and form a graph in a similar manner as described above, where the graph comprises nodes corresponding to the defined records and the additional source record. If the additional source record is connected to a plurality of defined records in the graph (e.g., using a desired threshold value), a determination can be made regarding which of the defined records have a stronger match based on an associated match score using the matching criteria. In examples, the defined record with the highest match score to the additional record is the record to which the additional record is merged. It should be noted, however, that the disclosed techniques may be iterative as described herein. Thus, after this merge (or any other merge described herein), the resulting nodes may match any one or more other nodes for further collapsing and/or merging.

Figure 9A:
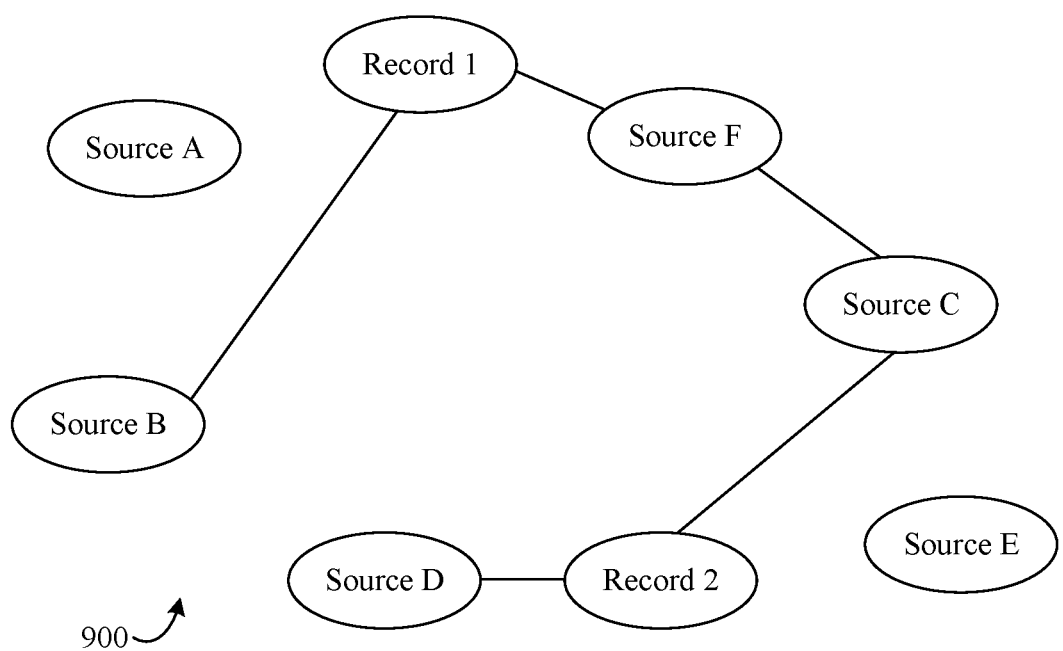
FIGS. 9A-9D illustrate an example of connecting and collapsing nodes in multiple iterations, in accordance with an example embodiment.

FIGS. 9A-9D depict another non-limiting example of connecting and collapsing nodes in multiple iterations, in accordance with an example embodiment. For instance, FIGS. 9A-9D comprise a collection of nodes that include underlying source records denoted as Source A, Source B, Source C, Source D, Source E, and Source F. In addition, the collection of nodes also includes two defined records denoted as Record 1 and Record 2. As shown in FIG. 9A, a graph 900 is depicted in which connections may be made between various nodes in a first iteration based on their attributes and application of a matching criteria. In FIG. 9A, Record 1 is directly connected to Source B and Source F, while Record 2 is directly connected to Source C and Source D. Source C and Source F are directly connected to each other. Source A and Source E are not connected to any nodes (e.g., based on their attributes not sufficiently matching any other individual node).

Figure 9B:
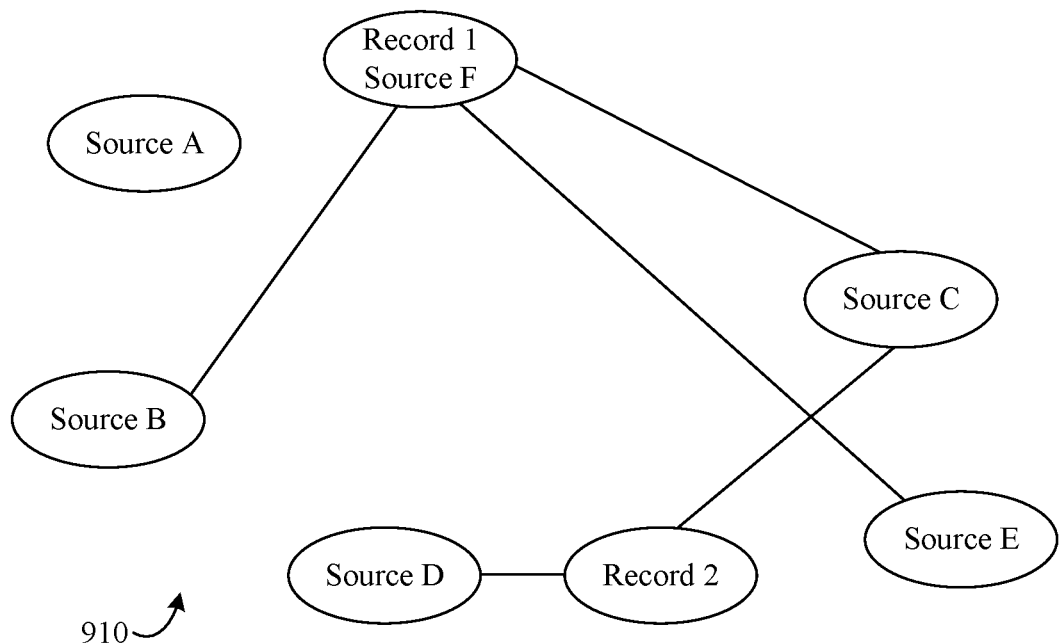

FIG. 9B illustrates a graph 910 of nodes after collapsing certain nodes of graph 900. In FIG. 9B, Record 1 and Source F are collapsed together. Although Source E was not connected to any nodes in graph 900, Source E is now connected to the newly collapsed node as shown in FIG. 9B based on application of the matching criteria (e.g., by analyzing the attributes of each pair of nodes, including collapsed nodes).

Figure 9C:
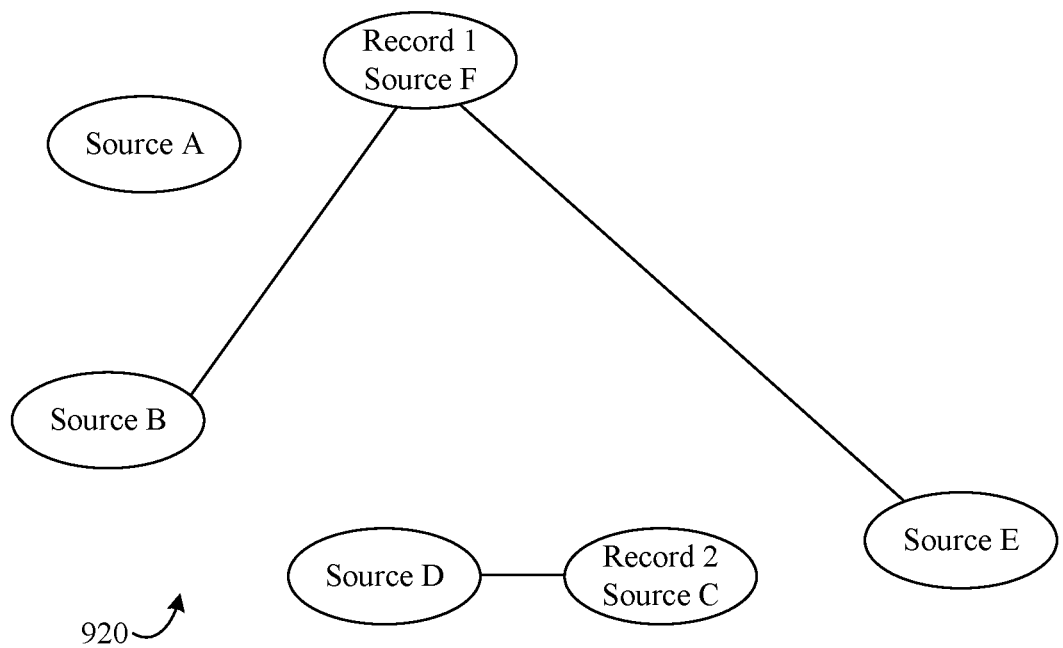

FIG. 9C illustrates a graph 920 of nodes after a collapsing of nodes of graph 910. In FIG. 9C, Record 2 and Source C are collapsed together. Even though Source C was connected to both Record 1 and Record 2 as shown in FIG. 9B, Source C had a higher match score with respect to Record 2 in this illustration, and therefore was collapsed into Record 2.

Figure 9D:
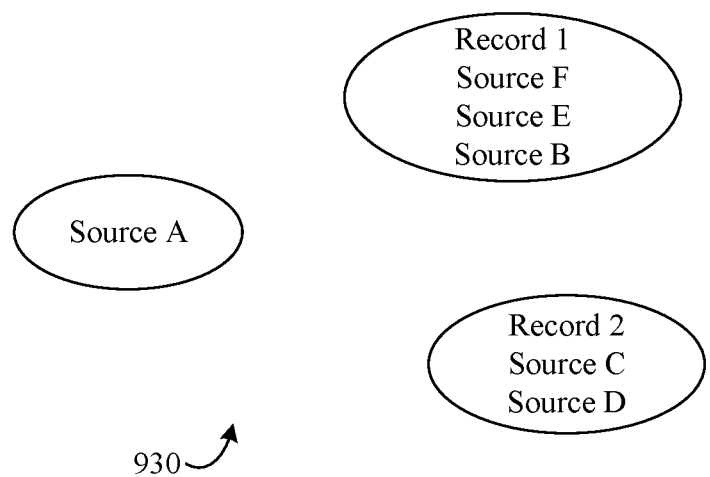

FIG. 9D illustrates a graph 930 of nodes after a collapsing of nodes of graph 920. In FIG. 9D, Source B and Source E were further collapsed into the node corresponding to Record 1, while Source D was collapsed into the node corresponding to Record 2. Source A, in this illustration, did not have a sufficient matching with any of the nodes (collapsed or otherwise), and therefore is not combined with either of the defined records. In some implementations, Source A will remain as a separate record (e.g., as a separate master record) following the splitting as described herein. As shown in FIG. 9D, master records are built for each of the three nodes shown, which may be stored in master record DB 112. In another example, Source A will be combined with one of the nodes, based on the match scores between Source A and each node. In yet another example, information associated with the collapsed nodes and Source A (or any other nodes that may or may not be combined with a defined record) may be provided via user interface 214, and a user input may be received via the user interface indicating which node, if any, Source A should belong. Thus, in some implementations, user interface 214 may receive one or more inputs indicative of whether any additional connections should be made (or alternatively, whether one or more connections should be manually removed).

FIGS. 10A-10C illustrate the automatic creation of defined records, in accordance with an example embodiment. FIG. 10A, for instance, depicts an example set 1000 of source records that were incorrectly combined together into a single master record (not shown). As seen in FIG. 10A, each source records contains at least a common last name, gender, DOB, and zip code. While not identical, the first name and middle name are at least similar across the various records.

In implementations, a false positive report may be received indicating that the source records as shown in FIG. 10A were incorrectly combined into a single master record. In some examples, the false positive report includes information identifying or distinguishing one or more of the distinct individuals. In one example, the false positive report indicates that the source records belong to a pair of twins (e.g., individuals that were born on the same date, have a similar name, and/or may live at the same address).

FIG. 10B shows an example false positive report 1010 received for the source records in FIG. 10A that were incorrectly grouped together. In FIG. 10B, two names are identified, each having the same middle initial, last name, gender and DOB. Both entries have different addresses and zip codes in this report. However, defined records created using all of these attributes of FIG. 10B may not result in an efficient or correct merging of nodes, as both individuals are associated with both addresses based on an analysis of the source records shown in FIG. 10A.

In example implementations, a differentiating attribute is identified based at least on the source records and/or the false positive report (e.g., as shown in FIGS. 10A and 10B). A differentiating attribute is an attribute with a value that is unique to a particular individual based on the set of source records. For instance, the differentiating attribute can comprise a first name, a middle name, last name, gender, DOB, address, zip code, phone number, or any other attribute. In some implementations, the differentiating attribute is identified in the received false positive report or via a user interface (e.g., user interface 214). In another implementation, the differentiating attribute is identified automatically based on an analysis of the underlying source records (e.g., by automatically identifying a value across the source records that are uniquely associated with a particular individual) or other information identified in the false positive report (e.g., an indication that the source records belong to twins with different first names). In yet another implementation, the differentiating attribute may be identified based on one or more rules, such as the defined records from which differentiating attributes are created comprise complete information (e.g., each attribute be populated with a value) and/or that the source records contain the value corresponding to the differentiating attribute. For instance, in the example of FIGS. 10A-10C, if the first name is to be selected as the differentiating attribute, each defined record should contain both addresses and the first name should be populated in both records. These rules are only illustrative, and other rules (e.g., in addition to, or in the alternative) may be implemented In the example shown in FIG. 10A, the differentiating attribute may be the first name (e.g., either received by user record generator 204 via an input or determined automatically by user record generator 204). Once the differentiating attribute is identified, user record generator 204 automatically creates a plurality of defined records 218. In creating each of the defined records, user record generator 204 may identify any record of the set of source records that contains the differentiating attribute and creates the defined record with one or more other attributes contained in such records. For instance, where the differentiating attribute is the first name, each source record that contains the same first name is identified, and a defined record is created with one or more attributes that are presented in the identified source records.

FIG. 10C illustrates an example set 1030 of defined records that are automatically created based on an identification of a differentiating attribute. In the example of FIG. 10C where the first name is the differentiating attribute, a first generated record is created that includes the differentiating attribute, along with the middle name, last name, gender, DOB, addresses, and zip codes that are associated with the differentiating attribute. In a similar fashion, a second defined record is also created. As show in this figure, the defined records contain a plurality of addresses and zip codes for each individual, as those addresses and zip codes were each associated with the differentiating attribute (i.e., the first name) based on an analysis of the underlying source records. Inclusion of these additional addresses in the defined record enable a graph to be generated in which connections can be created and/or collapsed efficiently and/or accurately. For instance, following creation of these defined records, similar techniques as described above may be utilized to determine which nodes are connected to the defined records and how to fully build each defined record with the appropriate demographic information.

Thus, in some implementations, user record generator 204 is configured to receive an input comprising at least two records indicative of a false positive match (e.g., in a false positive report), and optionally one or more differentiating attributes. The differentiating attributes may be selected from a list including but not limited to first name, middle name, last name, gender, DOB, street name, zip code, or any other attribute. In some implementations, as described earlier, the differentiating attributes are identified automatically. In some other implementations, a data steward or other user may input, review, and/or change (e.g., via user interface 214) differentiating attributes identified either manually or automatically. In some implementations, such as where multiple differentiating attributes are identified, both attributes may be used or a single attribute may be selected based on a predetermined priority (e.g., selecting zip code as the differentiating attribute rather than an address). In other implementations, such as where it may be known or inferred that the false positive match relates to twins, the first name may be selected as the differentiating attribute. After the differentiating factor is identified, each defined record is built automatically by merging demographic information from one or more of the underlying source records associated with each differentiating attribute. After each defined record is built in this manner, the process described above (e.g., with respect to generating a graph and collapsing nodes) may be implemented to build each defined record with the appropriate demographic information.

In some implementations, if the source records contain other differentiating attributes, those other attributes may also be used to identify which particular attribute should be selected as the differentiating attribute for building the defined record. For instance, if there are two different middle names Becky and Betsy, and Becky is associated strictly with Alexia and Betty strictly with Alexis, it may be determined that the first name should be used as the differentiating attribute. In other words, in this example, the middle name provides evidence that Alexia and Alexis are two different people, which allows for the first name to be selected as the differentiating attribute. In contrast, both middle names Becky and Betsy are associated with both zip codes in the above example, and therefore the zip code would not be used as the differentiating attribute. In this example, the middle name (instead of the first name) may also be used as the differentiating attribute. This particular example is only intended to illustrate how differentiating attributes may be selected, and is not intended to be limiting. In other implementation, any other differentiating attribute (or attributes) may be selected based on the content of the source records and/or the information contained in a false positive report.

III. Further Example Embodiments and Advantages

As described, systems and devices embodying the techniques herein may be configured and enabled in various ways to perform their respective functions. In some example embodiments, one or more of the operations of the flowcharts and/or flow diagrams described herein may not be performed. Moreover, operations in addition to or in lieu of the operations of the flowcharts and/or flow diagrams described herein may be performed. Further, in some example embodiments, one or more of the operations of the flowcharts and/or flow diagrams described herein may be performed out of order, in an alternate sequence, or partially (or completely) concurrently with each other or with other operations.

Embodiments and techniques, including methods, described herein may be performed in various ways such as, but not limited to, being implemented by hardware, or hardware combined with one or both of software and firmware. As described herein, systems, devices, components, etc., of the embodiments that are configured to perform functions and/or operations are also contemplated as performing such functions and/or operations.

IV. Example Processing Device Implementations

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 in FIG. 1 and system 200 in FIG. 2, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions. In embodiments with respect to the example computer implementations in this Section, main memory, memory cards and memory sticks, memory devices, and/or the like may include and or implement the described techniques and embodiments.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 11:
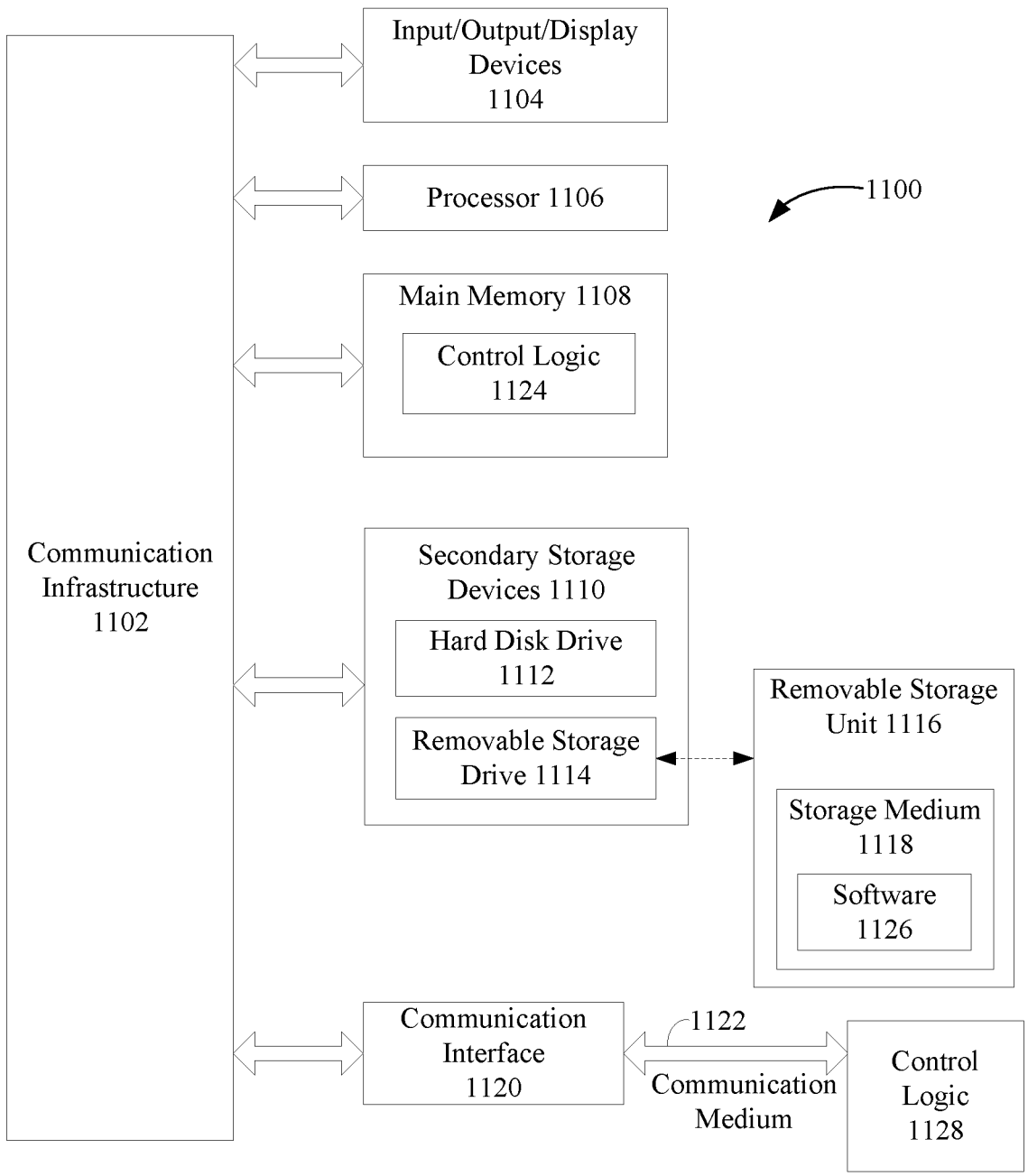
FIG. 11 shows a block diagram of a processing device/system in which the techniques disclosed herein may be performed and the embodiments herein may be utilized.

The embodiments described herein, including devices, systems, methods/processes, and/or apparatuses, may be implemented in or using processing devices, communication systems, servers, and/or, computers, such as a processing device 1100 shown in FIG. 11. It should be noted that processing device 1100 may represent mobile devices, communication devices/systems, entertainment systems/devices, processing devices, and/or traditional computers in one or more embodiments. For example, a system as described herein, and any of the sub-systems and/or components respectively contained therein and/or associated therewith, along with further embodiments thereof, may be implemented in or using one or more processing devices 1100 and/or similar computing devices.

Processing device 1100 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Processing device 1100 may be any type of computer, including a desktop computer, a server, etc., and may be a computing device or system within another device or system.

Processing device 1100 includes one or more processors (also called central processing units, or CPUs), such as a processor 1106. Processor 1106 is connected to a communication infrastructure 1102, such as a communication bus. In some embodiments, processor 1106 can simultaneously operate multiple computing threads, and in some embodiments, processor 1106 may comprise one or more processors.

Processing device 1100 also includes a primary or main memory 1108, such as random access memory (RAM). Main memory 1108 has stored therein control logic 1124 (computer software), and data.

Processing device 1100 also includes one or more secondary storage devices 1110. Secondary storage devices 1110 include, for example, a hard disk drive 1112 and/or a removable storage device or drive 1114, as well as other types of storage devices, such as memory cards and memory sticks. For instance, processing device 1100 may include an industry standard interface, such a universal serial bus (USB) interface for interfacing with devices such as a memory stick. Removable storage drive 1114 represents a floppy disk drive, a magnetic tape drive, a compact disk drive, an optical storage device, tape backup, etc.

Removable storage drive 1114 interacts with a removable storage unit 1116. Removable storage unit 1116 includes a computer useable or readable storage medium 1118 having stored therein computer software 1126 (control logic) and/or data. Removable storage unit 1116 represents a floppy disk, magnetic tape, compact disk, DVD, optical storage disk, or any other computer data storage device. Removable storage drive 1114 reads from and/or writes to removable storage unit 1116 in a well-known manner.

Processing device 1100 also includes input/output/display devices 1104, such as touchscreens, LED and LCD displays, monitors, keyboards, pointing devices, etc.

Processing device 1100 further includes a communication or network interface 1120. Communication interface 1120 enables processing device 1100 to communicate with remote devices. For example, communication interface 1120 allows processing device 1100 to communicate over communication networks or mediums 1122 (representing a form of a computer useable or readable medium), such as LANs, WANs, the Internet, etc. Network interface 1120 may interface with remote sites or networks via wired or wireless connections.

Control logic 1128 may be transmitted to and from processing device 1100 via the communication medium 1122.

Any apparatus or manufacture comprising a computer useable or readable medium having control logic (software) stored therein is referred to herein as a computer program product or program storage device. This includes, but is not limited to, processing device 1100, main memory 1108, secondary storage devices 1110, and removable storage unit 1116. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media and modulated data signals (i.e., do not include communication media or modulated data signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media and signals transmitted over wired media. Embodiments are also directed to such communication media.

The techniques and embodiments described herein may be implemented as, or in, various types of circuits, devices, apparatuses, and systems. For instance, embodiments may be included, without limitation, in processing devices (e.g., illustrated in FIG. 11) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 1106 of FIG. 11), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A computing system that includes:
    at least one memory device that store executable program code; and
    a processing system, comprising at least one processor, configured to receive the executable program code from the at least one memory device and, in response to at least receiving the program code, to:
        identify a master record that incorrectly groups a plurality of source records in a database, the plurality of source records containing demographic information for multiple people and obtained over a network from a plurality of different databases, each of the different databases corresponding to a database of a medical provider or pharmacy;
        create, according to a database schema that includes the database and a relations table that prevents linking between two records of the database, a first record containing demographic information for a first person, a second record containing demographic information for a second person, and exclusion data stored in the relations table of the database that indicates that the first record should not be linked to the second record, wherein the relations table does not identify a false positive relation between the plurality of source records;
        add the first record and the second record to a collection of source records that includes the plurality of source records that are incorrectly grouped together;
        execute a matching algorithm based at least on the collection of source records and processing the exclusion data stored in the relations table to identify a set of connections in the collection of source records, each connection of the set of connections indicating a match between two records based at least on a matching criteria, wherein the exclusion data prevents the first record and the second record from being linked to each other;
        store an indication of each connection in the database;
        build the first record and the second record based at least on the set of connections; and
        provide access to the database that includes the first record and the second record over the network to at least one medical provider or pharmacy.

2. The computing system of claim 1, wherein the processing system is further configured to:
    construct a graph comprising a plurality of nodes, each node corresponding to the first record, the second record, or one of the plurality of source records; and
    connect pairs of nodes of the graph that match according to the matching criteria, wherein the nodes corresponding to the first record and the second record are not directly connected to each other.

3. The computing system of claim 2, wherein the processing system is further configured to:
    collapse a pair of nodes that are connected to each other into a collapsed node, wherein the collapsed node contains demographic information of the pair of nodes; and
    update the graph based on the collapsed node.

4. The computing system of claim 3, wherein the processing system is further configured to:
    collapse additional pairs of nodes that are connected to each other and update the graph until the graph does not contain a node connected to either the first record or the second record.

5. The computing system of claim 2, wherein the connecting pairs of nodes of the graph comprises connecting pairs of nodes in which a set of attributes of a first node in the pair is identical to a set of attributes of a second node in the pair.

6. The computing system of claim 2, wherein the connecting pairs of nodes of the graph comprises connecting pairs of nodes in which a level of similarity between a set of attributes of a first node and a set of attributes of a second node in the pair is above a threshold value.

7. The computing system of claim 1, wherein the processing system is further configured to:
    identify an additional source record that overlaps with the first record and the second record; and
    merge the additional source record with either the first record or the second record based at least on the matching criteria.

8. The computing system of claim 1, wherein the first record and the second record are created in response to a user input, the user input identifying an initial set of attributes for each of the first record and the second record.

9. The computing system of claim 1, wherein at least some of the demographic information for the first person in the first record and at least some of the demographic information for the second person in the second record are identified automatically.

10. The computing system of claim 9, wherein the at least some of the demographic information for the first person in first record and the at least some of the demographic information for the second person in the second record are identified automatically in response to an identification of an attribute that differentiates the first person and the second person.

11. The computing system of claim 1, wherein the plurality of source records are incorrectly grouped together based on a false positive matching between at least some of the plurality of source records.

12. A method performed by a computing system, the method comprising:
   identifying a master record that incorrectly groups a plurality of source records in a database, the plurality of source records containing demographic information for multiple people and obtained over a network from a plurality of different databases, each of the different databases corresponding to a database of a medical provider or pharmacy;
   creating, according to a database schema that includes the database and a relations table that prevents linking between two records of the database, a first record containing demographic information for a first person, a second record containing demographic information for a second person, and exclusion data stored in the relations table of the database that indicates that the first record should not be linked to the second record, wherein the relations table does not identify a false positive relation between the plurality of source records;
   adding the first record and the second record to a collection of source records that includes the plurality of source records that are incorrectly grouped together;
   executing a matching algorithm based at least on the collection of source records and processing the exclusion data stored in the relations table to identify a set of connections in the collection of source records, each connection of the set of connections indicating a match between two records based at least on a matching criteria, wherein the exclusion data prevents the first record and the second record from being linked to each other;
   storing an indication of each connection in the database;
   building the first record and the second record based at least on the set of connections; and
   providing access to the database that includes the first record and the second record over the network to at least one medical provider or pharmacy.

13. The method of claim 12, further comprising:
   constructing a graph comprising a plurality of nodes, each node corresponding to the first record, the second record, or one of the plurality of source records; and
   connecting pairs of nodes of the graph that match according to the matching criteria, wherein the nodes corresponding to the first record and the second record are not directly connected to each other.

14. The method of claim 13, further comprising:
   collapsing a pair of nodes that are connected to each other into a collapsed node, wherein the collapsed node contains demographic information of the pair of nodes; and
   updating the graph based on the collapsed node.

15. The method of claim 12, wherein the first record and the second record are created in response to a user input, the user input identifying an initial set of attributes for each of the first record and the second record.

16. The method of claim 12, wherein at least some of the demographic information for the first person in the first record and at least some of the demographic information for the second person in the second record are identified automatically.

17. A computer-readable storage medium having program instructions encoded thereon that are executable by one or more processors to perform a computer-implemented method, the method comprising:
   identifying a master record that incorrectly groups a plurality of source records in a database, the plurality of source records containing demographic information for multiple people and obtained over a network from a plurality of different databases, each of the different databases corresponding to a database of a medical provider or pharmacy;
   creating, according to a database schema that includes the database and a relations table that prevents linking between two records of the database, a first record containing demographic information for a first person, a second record containing demographic information for a second person, and exclusion data stored in the relations table of the database that indicates that the first record should not be linked to the second record, wherein the relations table does not identify a false positive relation between the plurality of source records;
   adding the first record and the second record to a collection of source records that includes the plurality of source records that are incorrectly grouped together;
   executing a matching algorithm based at least on the collection of source records and processing the exclusion data stored in the relations table to identify a set of connections in the collection of source records, each connection of the set of connections indicating a match between two records based at least on a matching criteria, wherein the exclusion data prevents the first record and the second record from being linked to each other;
   storing an indication of each connection in the database;
   building the first record and the second record based at least on the set of connections; and
   providing access to the database that includes the first record and the second record over the network to at least one medical provider or pharmacy.

18. The computer-readable storage medium of claim 17, wherein the method further comprises:
   constructing a graph comprising a plurality of nodes, each node corresponding to the first record, the second record, or one of the plurality of source records; and
   connecting pairs of nodes of the graph that match according to the matching criteria, wherein the nodes corresponding to the first record and the second record are not directly connected to each other.

19. The computer-readable storage medium of claim 17, wherein the first record and the second record are created in response to a user input, the user input identifying an initial set of attributes for each of the first record and the second record.

20. The computer-readable storage medium of claim 17, wherein at least some of the demographic information for the first person in the first record and at least some of the demographic information for the second person in the second record are identified automatically.

* * * * *